(12) United States Patent
Olcott et al.

(10) Patent No.: US 7,495,201 B2
(45) Date of Patent: Feb. 24, 2009

(54) CHARGE MULTIPLEXED ARRAY OF SOLID-STATE PHOTOSENSITIVE DETECTORS

(75) Inventors: Peter D. Olcott, Menlo Park, CA (US); Craig S. Levin, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 36 days.

(21) Appl. No.: 11/653,079

(22) Filed: Jan. 11, 2007

(65) Prior Publication Data

US 2007/0217789 A1    Sep. 20, 2007

Related U.S. Application Data

(60) Provisional application No. 60/758,597, filed on Jan. 11, 2006.

(51) Int. Cl.
G01C 21/02 (2006.01)
G01C 21/24 (2006.01)
(52) U.S. Cl. ............. 250/206.1; 250/206.2; 250/208.2; 250/370.1; 348/311; 348/312
(58) Field of Classification Search ............. 250/206.1, 250/206.2, 208.2, 370.1; 348/311, 312
See application file for complete search history.

(56) References Cited

U.S. PATENT DOCUMENTS

| 3,028,050 | A | 4/1962 | Wallmark |
| 4,749,849 | A | 6/1988 | Hoeberechts |
| 4,877,951 | A | 10/1989 | Muro |
| 5,021,854 | A | 6/1991 | Huth |
| 5,500,376 | A | 3/1996 | Ishaque et al. |
| 5,757,057 | A | 5/1998 | Dabrowski |
| 6,111,299 | A | 8/2000 | Dabrowski |
| 6,781,133 | B2 | 8/2004 | Karplus et al. |
| 6,798,453 | B1 * | 9/2004 | Kaifu .................. 348/304 |
| 6,998,619 | B2 | 2/2006 | Karplus et al. |
| 7,058,253 | B1 * | 6/2006 | Novotny ............... 385/18 |
| 2005/0006564 | A1 * | 1/2005 | Skurnik et al. ......... 250/208.1 |
| 2005/0248675 | A1 * | 11/2005 | Hashimoto et al. ...... 348/308 |

OTHER PUBLICATIONS

K.S. Shah et al., "Large- area apds and monolithic apd arrays", IEEE Trans. Nucl. Sci., vol. 48, No. 6, Dec. 2001, pp. 2352-2356.
K.S. Shah et al., "Position- sensitive avalanche photodiodes for gamma ray imaging", IEEE Trans. Nucl. Sci., vol. 49, No. 4, Part 1, Aug. 2002, pp. 1967-1692.

(Continued)

Primary Examiner—Seung C Sohn
(74) Attorney, Agent, or Firm—Lument Patent Firm

(57) ABSTRACT

A charge multiplexed position sensing apparatus and method for measuring an incident radiation with the aid of an array of solid-state photosensitive detectors such as an array of avalanche photodiodes (APDs). The solid-state photosensitive detectors multiplex sum terminal(s) and a number of correspondent spatial terminals separately. Sum signal busses are provided to establish separate connections to the sum terminals of each solid-state photosensitive detector. Spatial signal busses interconnect correspondent spatial terminals of all of the solid-state photosensitive detectors such that correspondent spatial terminals are all connected to the same spatial signal bus. The multiplexing circuit triggers on electrical signals corresponding to sum or total voltages generated by the incident radiation.

20 Claims, 4 Drawing Sheets

OTHER PUBLICATIONS

N. Zhang et al ., "RF Transformer Coupled Multiplexing Circuits for APD PET Detectors", Nuclear Science, IEEE Transactions, vol. 53, Issue 5, Part 1, Oct. 2006, 2570-2577.

Gramsch et al. "High density avalanche photodiode array", Proc. SPIE vol. 2022, Oct. 1993, pp. 111-119.

S. Siegel et al., simple charge division readouts for imaging scintillator arrays using a multi-channel pmt, IEEE Trans. Nucl. Sci., vol. 43, No. 3, Jun. 1996, pp. 1634-1641 (part 2).

P.D. Olcott et al., "Compact readout electronics for position sensitive photomultiplier tubes", IEEE Trans. Nucl. Sci., vol. 52, No. 1, Feb. 2005, pp. 21-27.

* cited by examiner

CHARGE MULTIPLEXED ARRAY OF SOLID-STATE PHOTOSENSITIVE DETECTORS

RELATED APPLICATIONS

This patent application claims priority from Provisional Patent Application No. 60/758,597 filed on Jan. 11, 2006 and incorporated herein in its entirety.

GOVERNMENT RIGHTS CLAUSE

The present invention was supported by the National Institute of Health under contracts NIH R21 EB003283 and NIH R21 CA098691. The government has certain rights in this invention.

FIELD OF THE INVENTION

This invention relates generally to multiplexed operation of an array of solid-state photosensitive detectors such as avalanche photodiodes that measure incident radiation and determine various parameters thereof, including centroid position.

BACKGROUND ART

Numerous applications in science, industry and health care require detectors that can perform measurements on incident radiation, e.g., determine the time and position at which the radiation was incident. A position sensitive device (PSD) originally described by J. T. Wallmark, "A new semiconductor photocell using lateral photoeffect", Proc. IRE, vol. 45, no. 4, pp. 474-483, April 1957 (see also U.S. Pat. No. 3,028,050 to J. T. Wallmark) has become a useful tool for such purposes, since the PSD is specifically designed to yield information about the time of incidence of the radiation, its energy and location of its centroid.

The most successful types of PSDs thus far are based on solid-state devices with a photosensitive, reverse biased p-n semiconductor junction. Salient aspects of such p-n semiconductor junction PSDs are described in U.S. Pat. No. 4,749,849 to Hoeberechts et al. and in U.S. Pat. No. 4,877,951 to Muro. Several recent PSD implementations use avalanche photodiodes with internal gain as described, for example, by Karplus et al. in U.S. Pat. Nos. 6,781,133 and 6,998,619.

Some applications, e.g., in health care, require measurement of short wavelength radiation. To perform such measurements it is known to extend the useful range of a PSD by interposing a fluorescent material such as a scintillator crystal between the high-energy radiation and the PSD. The scintillator converts the high-energy radiation, e.g., X-rays or gamma rays into lower energy radiation. The PSD then performs its measurements on the low energy secondary radiation, e.g., in the visible or infra-red range to determine time of incidence, total energy and centroid location. Particular interest in the scintillator based PSD approach is found in the fields of Positron Emission Tomography (PET) or single photon emission computed tomography (SPECT), where most solutions rely on less compact apparatus, e.g., devices employing photomultiplier tubes (PMTs). Some examples of using avalanche photodiode arrays and position sensitive avalanche photodiodes (PSAPDs) for detecting gamma rays using scintillation crystals can be found in K. S. Shah et al., "Large-area apds and monolithic apd arrays", IEEE Trans. Nucl. Sci., Vol. 48, No. 6, December 2001, pp. 2352-2356; K. S. Shah et al., "Position-sensitive avalanche photodiodes for gamma ray imaging", IEEE Trans. Nucl. Sci., Vol. 49, No. 4, Part 1, August 2002, pp. 1687-1692, and N. Zhang et al., "RF Transformer Coupled Multiplexing Circuits for APD PET Detectors", Nuclear Science, IEEE Transactions, Vol. 53, Issue 5, Part 1, October 2006, pp. 2570-2577.

Manufacturing approaches for commercially viable, large area and high-gain avalanche photodiodes that can be used in PSAPDs are known in the art. These typically involve producing an array of discrete pixels or position sensitivity within one large pixel on a monolithic device. For more information, the reader is referred to U.S. Pat. No. 5,021,854 to Huth, U.S. Pat. Nos. 5,757,057 and 6,111,299 to Dabrowski, U.S. Pat. No. 5,500,376 to Ishaque and Gramsch et al. "High density avalanche photodiode array", Proc. SPIE Vol. 2022, October 1993, pp. 111-119.

One of the drawbacks to reading out an individual array of many discrete solid-state PSD pixels or a system built from many monolithic solid-state PSDs involves the large number of outputs per device and their relatively low amplification capabilities as compared to a PMT. In fact, PMTs easily lend themselves to multiplexed readout, as described, e.g., by S. Siegel et al., "Simple charge division readouts for imaging scintillator arrays using a multi-channel pmt", IEEE Trans. Nucl. Sci., Vol. 43, No. 3, June 1996, pp. 1634-1641 (part 2) and by P. D. Olcott et al., "Compact readout electronics for position sensitive photomultiplier tubes", IEEE Trans. Nucl. Sci., Vol. 52, No. 1, February 2005, pp. 21-27. Meanwhile, multiplexing of solid-state PSDs such as PSAPDs represents an unsolved challenge.

OBJECTS AND ADVANTAGES

In view of the above prior art limitations, it is an object of the invention to provide an efficiently multiplexed position sensing apparatus that employs an array of solid-state PSDs such as PSAPDs.

It is a further object of the invention to provide a method for multiplexing such arrays.

These and other objects and advantages of the invention will become apparent from the ensuing description.

SUMMARY OF THE INVENTION

The objects and advantages of the invention are secured by a multiplexed position sensing apparatus for measuring an incident radiation with the aid of an array of solid-state photosensitive detectors such as, for example, an array of avalanche photodiodes (APDs). Each of the solid-state photosensitive detectors has a sum terminal(s) and a number of correspondent spatial terminals. A number of sum signal busses equal to the total number of solid-state photosensitive detectors are provided to establish separate connections to the sum terminals of each solid-state photosensitive detector. A number of spatial signal busses equal to the number of correspondent spatial terminals in one solid-state photosensitive detector are provided and each of the spatial signal busses interconnects correspondent spatial terminals of all of the solid-state photosensitive detectors. In other words, correspondent spatial terminals are all connected to the same spatial signal bus.

The apparatus has a multiplexing circuit that triggers on electrical signals arriving on sum signal busses and processes the electrical signals arriving on spatial signal busses. The multiplexing circuit uses the electrical signals to measure the incident radiation. More precisely, the measurement may include incident radiation parameters such as total energy, time of incidence and/or centroid location. The sum signal busses and the spatial signal busses are all charge-coupled with the aid of appropriate electrical coupling elements such as capacitors, resistors, inductors, or direct connections. In other words, the multiplexed position sensing apparatus is a charge multiplexed apparatus.

The multiplexing arrangement of the invention permits the use of just one operational amplifier for amplifying the electrical signals from each of the charge-coupled sum signal and spatial signal busses. This results in significant simplification of the multiplexing circuit.

In a preferred embodiment the solid-state photosensitive devices are solid-state position sensitive devices (PSDs) such as avalanche photodiodes (APDs), i.e., discrete APDs, and more preferably still, position sensitive avalanche photodiodes (PSAPDs). The geometry of the PSAPDs can be circular (polar coordinates), rectangular (Cartesian coordinates) or any other suitable geometry. In the specific case of rectangular geometry the correspondent spatial terminals are the correspondent four corner terminals. It is also advantageous for many applications to mount the PSAPDs of the array on flex tapes. This can be done in pairs or in greater numbers.

The multiplexed position sensing apparatus of the invention has a trigger that triggers on the electrical signals from the sum signal busses. Specifically, the sum signal busses tell the multiplexing circuit to use the trigger to recognize which specific PSAPD is providing electrical signals from its correspondent spatial terminals at any given time.

In order to minimize position errors it is preferable to connect the solid-state photosensitive devices according to a tiling scheme. In one embodiment, the devices can be connected in accordance with a checkerboard tiling. In an alternative embodiment, the devices are connected in a corner coupled tiling.

The invention further extends to a method for multiplexing the array of solid-state photosensitive devices such as PSDs or PSAPDs that have a sum terminal and correspondent spatial terminals. In accordance with the method, the sum terminal of each PSAPD is separately connected to its own sum signal bus. The correspondent spatial terminals of all PSAPDs are interconnected to separate spatial signal busses.

During operation the array is exposed to incident radiation and the electrical signals generated from the sum signal busses are used for triggering. The electrical signals from the spatial signal busses are processed to measure the incident radiation. The processing can involve the application of any algorithm for measuring a parameter of the incident radiation. For example, a centroid detection algorithm may be applied to measure the centroid location. Alternatively, total charge corresponding to total energy of incident radiation can be determined directly from sum signal busses or by an algorithm that sums the electrical signals from the spatial signal busses. The time of incidence can be measured with an appropriate timing algorithm.

A detailed description of the preferred embodiments of the invention is presented below in reference to the appended drawing figures.

BRIEF DESCRIPTION OF THE DRAWING FIGURES

DETAILED DESCRIPTION

Figure 1:
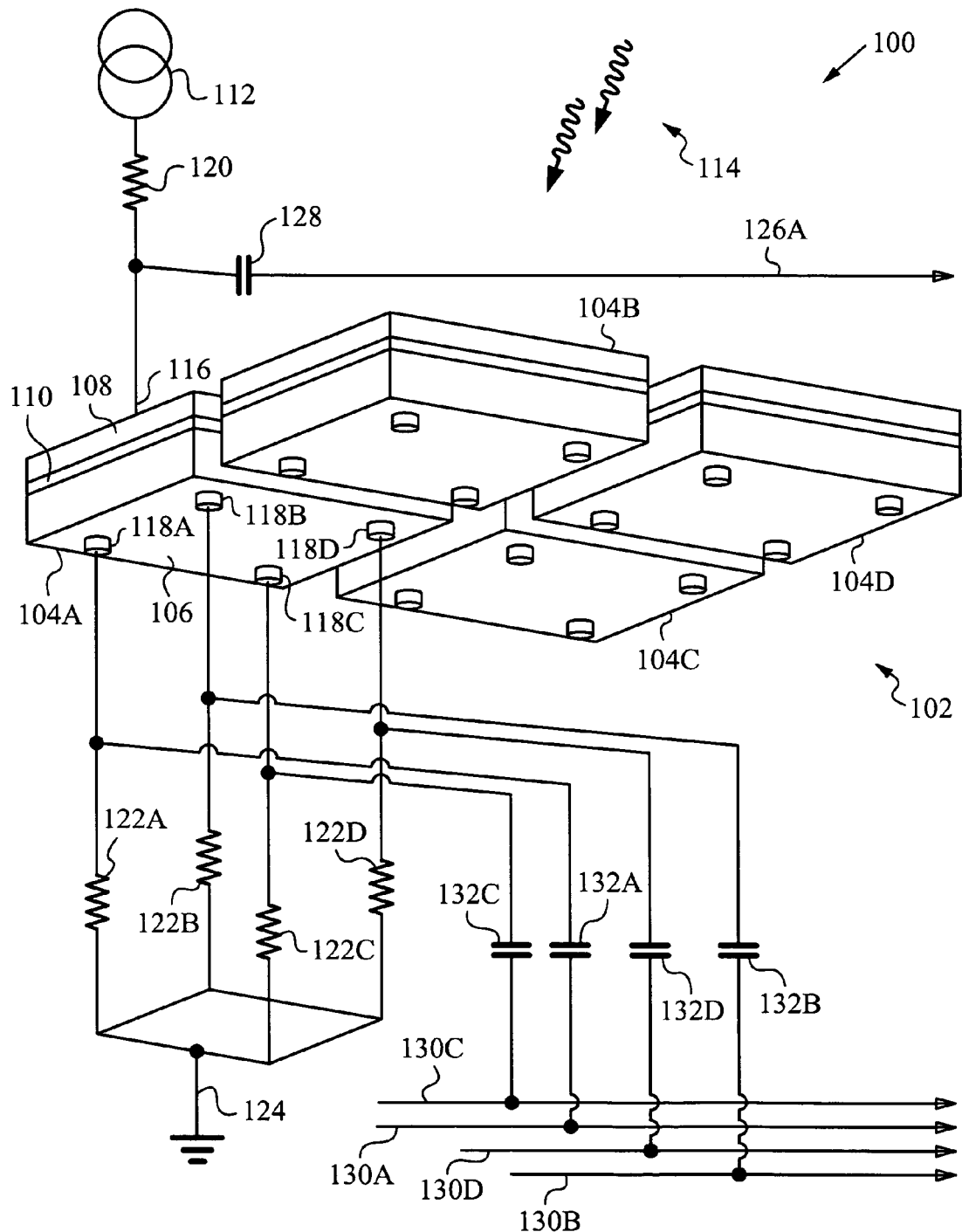
FIG. 1 is a partial and simplified three-dimensional diagram illustrating the basic principles of a charge multiplexed array of PSAPDs in accordance with the invention.

The principles and operation of a multiplexed position sensing apparatus according to the invention will be best understood by initially reviewing a simplified three-dimensional diagram of FIG. 1. This diagram shows a multiplexed position sensing apparatus 100 employing an array 102 of four solid-state photosensitive detectors 104A, 104B, 104C, 104D.

In this embodiment all four detectors 104A, 104B, 104C, 104D are position sensitive detectors (PSDs) and more precisely still, they are position sensitive avalanche photodiodes (PSAPDs) having a rectangular geometry. Alternatively, discrete avalanche photodiodes (APDs) that do not have explicit spatial sensitivity of a large single pixel PSAPD can also be used. In other words, in the context of charge multiplexing as understood herein, we define array 102 to be made up of either smaller discrete pixel arrays of APDs with spatially dependent charge multiplexed interconnections between pixels or large single pixel devices such as PSAPDs with spatial sensitivity within that pixel; both approaches provide positioning capabilities within the sensitive area.

For clarity, only PSAPD 104A is shown fully connected and is discussed below, but it is understood that remaining three PSAPDs 104B, 104C, 104D share the same construction and connections. PSAPD 104A has a bottom cathode 106 and a top anode 108 that sandwich a depletion region 110. Bottom cathode 106 is preferably executed by diffusing an n-type substrate with a p-type material. A high voltage source 112 is connected to PSAPD 104A for providing a reverse bias across a semiconductor junction formed in depletion region 110. As is well known, a reverse-biased p-n junction will produce positive and negative charge carriers that migrate to opposite sides of PSAPD 104A in proportion to the intensity of an incident radiation 114. The reverse bias should be about 1,700 to 1,800 V to ensure high quantum efficiency of conversion from photons to charge carriers.

Note that PSAPD 104A should have a field spreading structure (not shown) such as a diffused bevel, a mechanical bevel, a guard ring or other lateral feature to mitigate the deleterious effects of the reverse bias. Such field spreading structures are well known and are used to help prevent breakdown or arcing, adjust the electric field distribution in the device and promote a more linear spatial response of PSAPD 104A.

PSAPD 104A has a sum terminal 116 and a number of correspondent spatial terminals 118A, 118B, 118C, 118D. A bias control resistor 120 is connected in series with sum terminal 116. Additional bias control resistors 122A, 122B, 122C, 122D are connected between each correspondent spatial terminal 118A, 118B, 118C, 118D and ground 124 to control bias and leakage currents.

In accordance with the invention a single sum signal bus 126A is provided for PSAPD 104A and connected to its sum terminal 116. Sum signal bus 126A is charge-coupled with the aid of an electrical coupling element 128. In the present embodiment, coupling element 128 is a capacitor. Alternatively, a resistor an inductor and in some cases (given proper biasing) even a direct connection can be used as coupling element 128. Note that remaining PSAPDs 104B, 104C, 104D of array 102 are also provided with sum signal buses that are charge coupled.

Also provided is a number of spatial signal busses 130A, 130B, 130C, 130D equal to the number of correspondent spatial terminals 118A, 118B, 118C, 118D and interconnected with them. Similarly to sum signal bus 126, spatial signal busses 130A, 130B, 130C, 130D are all charge-coupled with the aid of corresponding electrical coupling elements 132A, 132B, 132C, 132D represented by capacitors. Once again, however, other coupling elements such as resistors, inductors or even direct connections can be used to achieve appropriate charge-coupling between spatial terminals 118A, 118B, 118C, 118D and spatial signal busses 130A, 130B, 130C, 130D.

Figure 2:
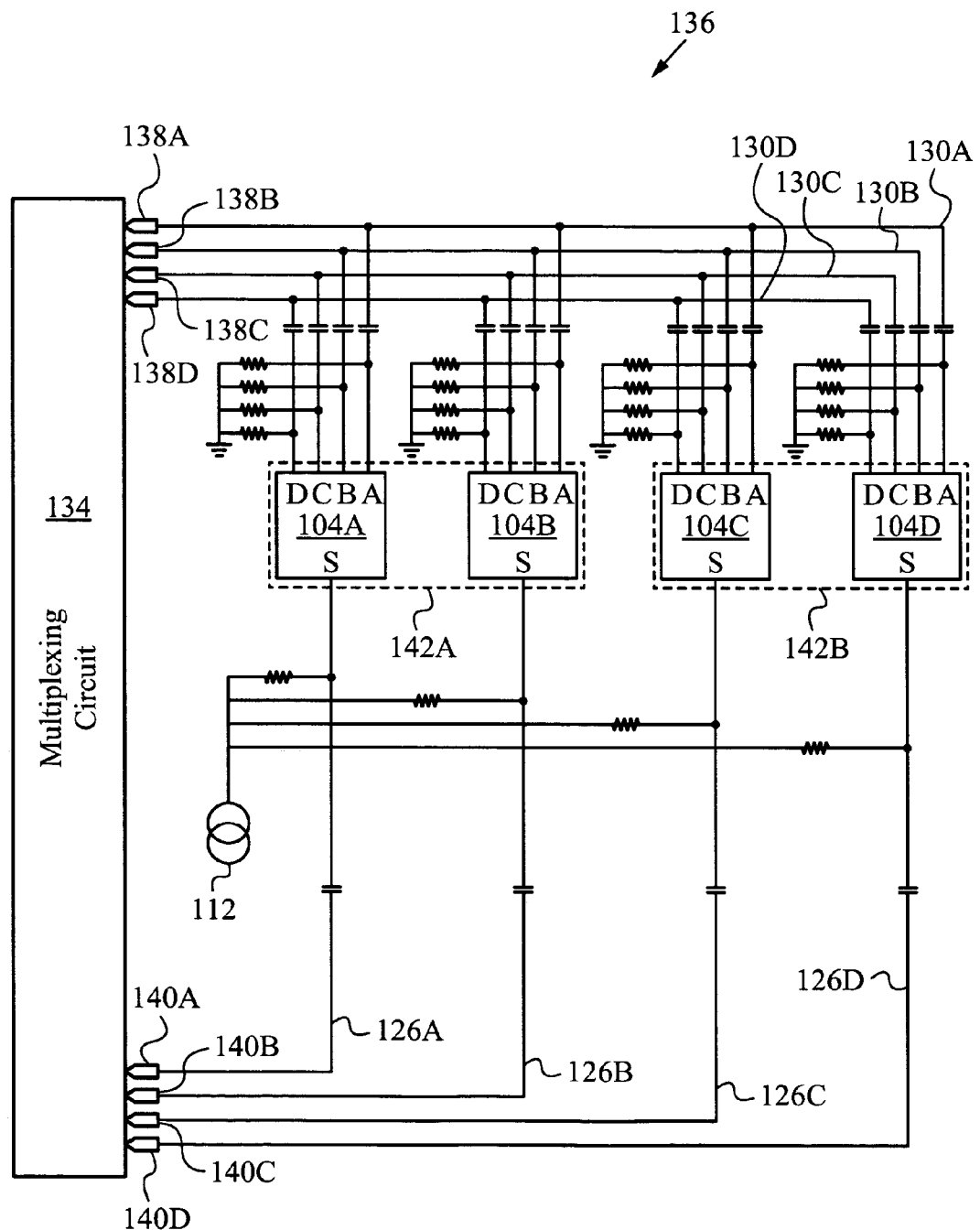
FIG. 2 is a circuit diagram of the charge multiplexed array employing the PSAPDs of FIG. 1.

The apparatus has a multiplexing circuit 134 shown in detail in a complete circuit diagram 136 drawn in FIG. 2. PSAPDs 104A, 104B, 104C, 104D are all connected with their correspondent spatial terminals labeled only by A, B, C, D and their sum terminals labeled by S. Specifically, correspondent spatial terminals A, B, C, D are all interconnected with spatial signal busses 130A, 130B, 130C, 130D such that correspondent spatial terminals are all connected to the same spatial signal bus. There are four spatial terminals A, B, C, D, one for each corner of every PSAPD 104A, 104B, 104C, 104D. The number of spatial signal busses 130A, 130B, 130C, 130D is equal to the number of correspondent spatial terminals A, B, C, D. Each spatial terminal A, B, C, D generates an electrical signal corresponding to the instantaneous corner voltage $V_{corner}$ that results from charges produced by incident radiation 114.

A number of sum signal busses 126A, 126B, 126C, 126D equal to the total number of PSAPDs 104A, 104B, 104C, 104D are provided to establish separate connections to sum terminals S of each PSAPD 104A, 104B, 104C, 104D. Each sum terminal S generates an electrical signal corresponding to the top voltage $V_{top}$ that results from charges produced by incident radiation 114. Top voltage $V_{top}$ corresponds to the sum electron signal produced by the charges and is thus proportional to the total energy $E_{total}$ of incident radiation 114 impinging on the corresponding PSAPD. In addition, neglecting small gain variations due to charge loss in each readout path, the total electrical signal from spatial terminals A, B, C, D is equal to the electrical signal from sum terminal S in each PSAPD, as expressed by:

$$E_{total} \propto V_{top} = \Sigma V_{corner}.$$

Each spatial signal bus 130A, 130B, 130C, 130D is equipped with a corresponding amplification device 138A, 138B, 138C, 138D. Likewise, each sum signal bus 126A, 126B, 126C, 126D is equipped with a corresponding amplification device 140A, 140B, 140C, 140D. Depending on application, signal level and capabilities of multiplexing circuit 134, the amplification devices could be pre-amplifiers, operational amplifiers or other types of amplifiers.

The values of the capacitances and resistors (for reference numerals see FIG. 1) necessary to operate circuit 136 can be determined by a skilled artisan. In the particular embodiment shown, all capacitors are 1 nF and the biasing resistors are all 1 MΩ. The pre-amplifiers are all Cremat type.

In one particularly useful embodiment, PSAPDs 104A, 104B, 104C, 104D are mounted on a flex tape. In particular, PSAPDs 104A, 104B are mounted on a first flex tape 142A and PSAPDs 104C, 104D are mounted on a second flex tape 142B. In contrast to the limitations of mounting photomultiplier tubes typically used in prior art solutions, the flexibility offered by such mounting is extraordinarily beneficial in many applications. Specifically, when working with scintillation crystals for medical applications such as Positron Emission Tomography (PET) this flexibility is of great value.

During operation, array 102 of apparatus 100 is exposed incident radiation 114. Multiplexing circuit 134 triggers on electrical signals arriving on sum signal busses 126A, 126B, 126C, 126D. In other words, electrical signals corresponding to $V_{top}$ for each PSAPD 104A, 104B, 104C, 104D are used for timing control purposes. Thus, circuit 134 multiplexes such that it only considers electrical signals corresponding to the corner voltages $V_{corner}$ generated by spatial terminals A, B, C, and D of the PSAPD which is providing its electrical signal corresponding to $V_{top}$ on its sum signal bus. The advantage of this approach is that rather than requiring 16 channels in unmultiplexed prior art operation, circuit 136 needs only 8 channels to collect all the necessary electrical signals to measure incident radiation 114. Note that with larger arrays, the multiplexing arrangement of the invention permits the use of just one operational amplifier for amplifying the electrical signals from each of the charge-coupled sum signal and spatial signal busses. This results in significant simplification of the multiplexing circuit.

Various measurements can be performed by multiplexing circuit 134 include incident radiation parameters such as total energy, time of incidence and centroid location. The measurements are performed by processing the electrical signals corresponding to voltages $V_{top}$ and $V_{corner}$. In one embodiment, the processing involves application of a centroid detection algorithm that uses corner voltages $V_{corner}$. Specific techniques for performing such measurements are well-known to those skilled in the art.

Although multiplexing introduces spatial signal degradation, the multiplexing approach of the invention manages to retain excellent performance because of the separate processing of sum and spatial signals. Specifically, triggering from the sum signal bus is one of the important aspects of the present approach that maintains performance. In fact, the energy resolution of an apparatus multiplexed in accordance with the teaching of the invention undergoes no appreciable degradation. In addition, the approach is highly scalable to much larger arrays and higher fill factors or sensor densities.

The multiplexing approach of the invention can be practiced with solid-state photosensitive devices and position sensitive devices (PSDs) of various geometries. For example, rather than employing PSDs with rectangular geometry, it is possible to use PSDs with other geometries such as circular or polar geometry. A person skilled in the art will appreciate, that such devices produce sum signals that can be used for triggering as described above. Meanwhile, the spatial signals from correspondent spatial terminals can be multiplexed according to the geometry, e.g., to recover centroid position in terms of radius r and angle θ, rather than location x, y.

In order to further improve the performance on the multiplexed position sensing apparatus of the invention, it is advantageous to limit the amount of ambiguities and cross-talk. To accomplish this, the solid-state photosensitive detectors can be arranged in special patterns, in other words, they can be tiled.

Figure 3:
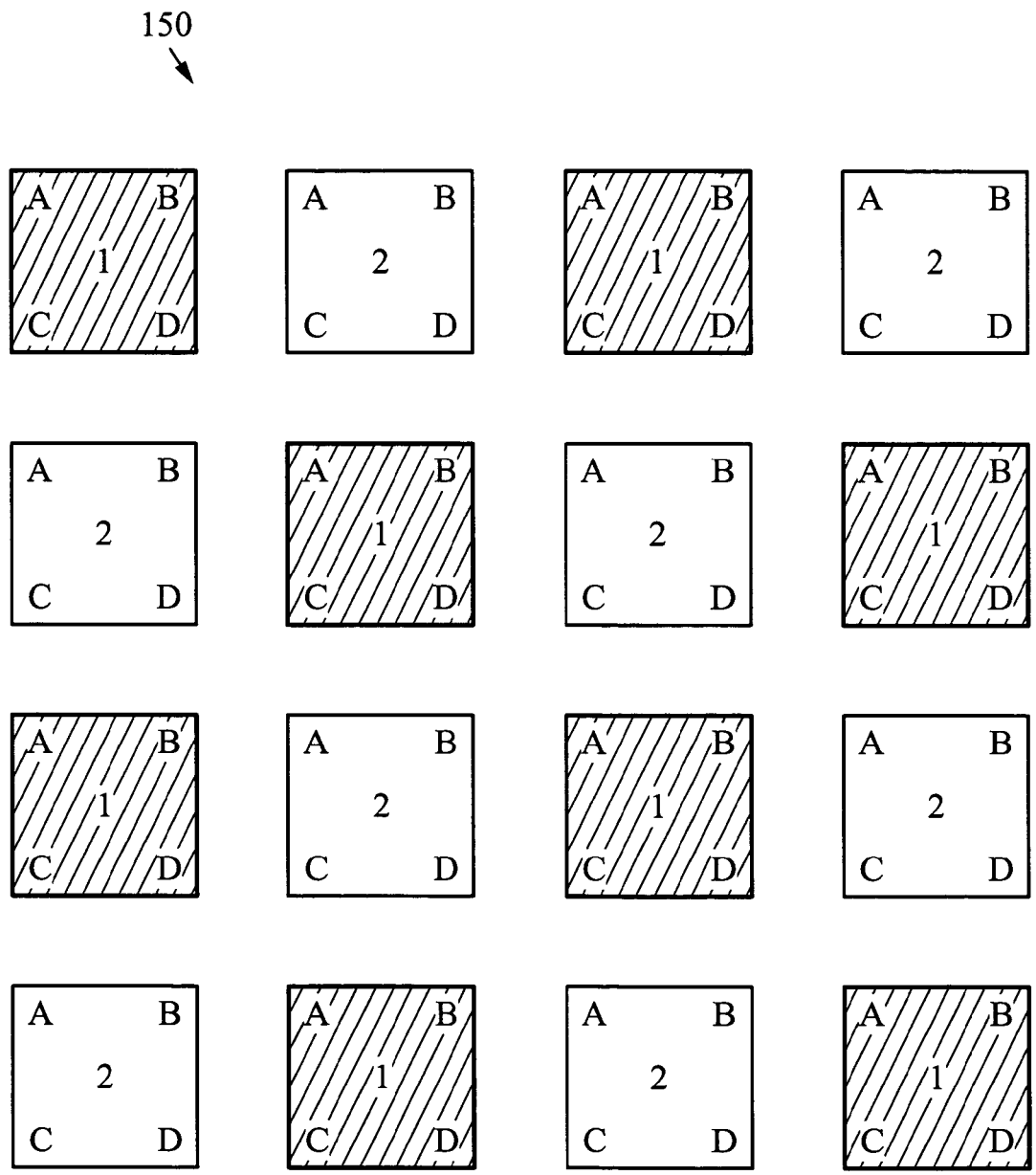
FIG. 3 is a top view diagram of a checkerboard tiling of solid-state photosensitive detectors according to the invention.

FIG. 3 illustrates an exemplary tiling pattern 150 for improving performance by minimizing the potential for interaction between two solid-state photosensitive devices sharing the same bus. In particular, tiling 150 is a checkerboard tiling in which the devices labeled by reference 1 share one set of buses and detectors labeled by reference 2 share a different set of buses. The spatial terminals are labeled by A, B, C, D as in the above embodiment.

Figure 4:
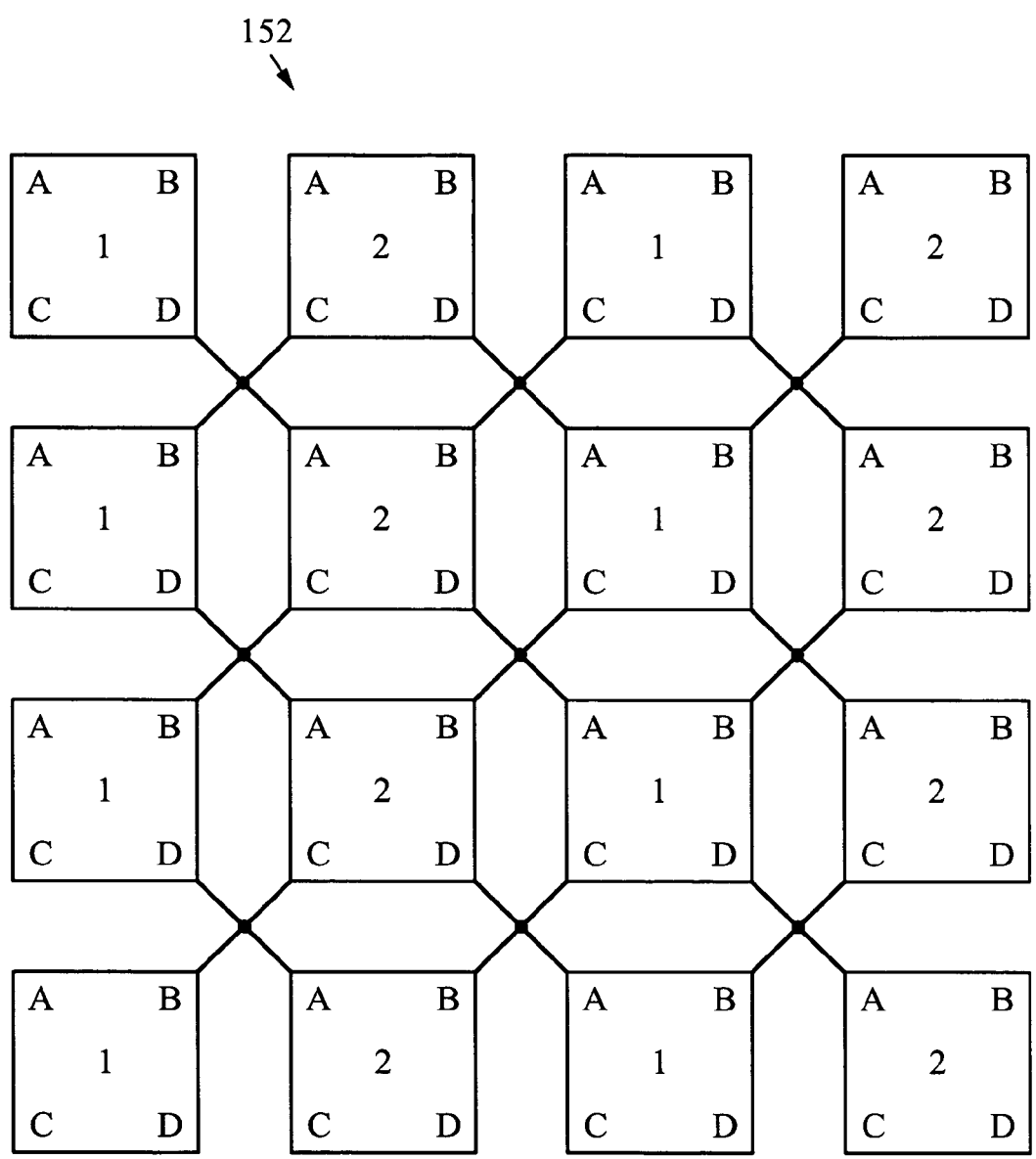
FIG. 4 is a top view diagram of a corner-coupled tiling of solid-state photosensitive detectors according to the invention.

FIG. 4 illustrates another exemplary tiling pattern 152 for resolving multi-interactions across the solid-state devices, once again labeled by references 1 and 2. In particular, tiling 152 is a corner coupled tiling in which spatial terminals A, B, C and D of the solid-state devices are connected to their corner neighbors.

Of course, a person skilled in the art will recognize that many any other embodiments of the apparatus and method are possible. Therefore, the scope of the invention should be judged by the appended claims and their legal equivalents.

We claim:

1. A multiplexed position sensing apparatus for measuring an incident radiation and comprising:
    a) an array of solid-state photosensitive detectors each having a sum terminal and a plurality of correspondent spatial terminals;
    b) a plurality of sum signal busses each separately connected to said sum terminal of each of said solid-state photosensitive detectors;
    c) a plurality of spatial signal busses, wherein each of said spatial signal busses interconnects said correspondent spatial terminals of all of said solid-state photosensitive detectors, and wherein each of said spatial signal busses is connected to one of said correspondent spatial terminals of each of said solid-state photosensitive detectors; and
    d) a multiplexing circuit triggering on electrical signals from said sum signal busses and processing electrical signals from said spatial signal busses to measure said incident radiation.

2. The multiplexed position sensing apparatus of claim 1, wherein said sum signal busses and said spatial signal busses are charge-coupled.

3. The multiplexed position sensing apparatus of claim 2, wherein each of said charge-coupled sum signal busses and said charge-coupled spatial signal busses has an operational amplifier for amplifying said electrical signals.

4. The multiplexed position sensing apparatus of claim 1, wherein said solid-state photosensitive detectors are avalanche photodiodes.

5. The multiplexed position sensing apparatus of claim 4, wherein said avalanche photodiodes are position sensitive avalanche photodiodes.

6. The multiplexed position sensing apparatus of claim 5, wherein said position sensitive avalanche photodiodes have a rectangular geometry and said correspondent spatial terminals comprise correspondent four corner terminals.

7. The multiplexed position sensing apparatus of claim 5, wherein said position sensitive avalanche photodiodes are mounted on flex tapes.

8. The multiplexed position sensing apparatus of claim 1, wherein said solid-state photosensitive detectors are tiled.

9. The multiplexed position sensing apparatus of claim 8, wherein said solid-state photosensitive detectors are tiled in a checkerboard tiling.

10. The multiplexed position sensing apparatus of claim 8, wherein said solid-state photosensitive detectors are tiled in a corner coupled tiling.

11. A method for multiplexing an array of solid-state photosensitive detectors each having a sum terminal and correspondent spatial terminals, said method comprising the steps of:
    a) separately connecting said sum terminal of each of said solid-state photosensitive detectors to a sum signal bus;
    b) interconnecting said correspondent spatial terminals of all of said solid-state photosensitive detectors to separate spatial signal busses, wherein the number of said spatial signal busses is equal to the number of said correspondent spatial terminals of each of said solid-state photosensitive detectors, and wherein each of said spatial signal busses is connected to one of said correspondent spatial terminals of each of said solid-state photosensitive detectors;
    c) exposing said array to incident radiation;
    d) triggering on electrical signals from said sum signal busses; and
    e) processing electrical signals from said spatial signal busses to measure said incident radiation.

12. The method of claim 11, wherein said processing comprises application of a centroid detection algorithm.

13. The method of claim 11, further comprising tiling said solid-state position sensitive detectors.

14. The method of claim 11, wherein said solid-state photosensitive detectors comprise avalanche photodiodes.

15. The method of claim 14, wherein said avalanche photodiodes comprise position sensitive avalanche photodiodes.

16. The multiplexed position sensing apparatus of claim 1, wherein the number of said spatial signal busses is equal to the number of said correspondent spatial terminals of each of said solid-state photosensitive detectors.

17. The multiplexed position sensing apparatus of claim 1, wherein said triggering on electrical signals from said sum signal bus of each of said solid-state photosensitive detectors are used for timing control.

18. The multiplexed position sensing apparatus of claim 1, wherein said solid-state photosensitive detectors are approximately square, wherein each of said solid-state photosensitive detectors has four correspondent spatial terminals, wherein one of said four correspondent spatial terminals is located at each corner of said solid-state photosensitive detectors, wherein said solid-state photosensitive detectors are tiled in a corner-coupling tiling, and wherein said corner-coupling tiling comprises interconnecting four of said correspondent spatial terminals from four of said adjacent solid-state photosensitive detectors, thereby every correspondent spatial terminal is interconnected with three other correspondent spatial terminals.

19. The method of claim 11, wherein said triggering comprises recognizing which of said solid-state photosensitive detectors produced electrical signals.

20. The method of claim 19, wherein said processing comprises considering only electrical signals from said correspondent spatial terminals of said solid-state photosensitive detector recognized in said triggering.

* * * * *